(12) United States Patent
Van Tilburg et al.

(10) Patent No.: US 10,772,283 B2
(45) Date of Patent: Sep. 15, 2020

(54) MILK TANK SYSTEM, INTERMEDIATE MILK STORAGE VESSEL FOR THIS, MILKING SYSTEM FOR THIS, AND METHOD FOR CLEANING THIS

(71) Applicant: LELY PATENT N.V., Maassluis (NL)

(72) Inventors: Ruben Alexander Van Tilburg, Maassluis (NL); Mattheus Jacob De Hullu, Maassluis (NL); Dirk Dijkshoorn, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 484 days.

(21) Appl. No.: 15/128,157

(22) PCT Filed: May 4, 2015

(86) PCT No.: PCT/NL2015/050307
§ 371 (c)(1),
(2) Date: Sep. 22, 2016

(87) PCT Pub. No.: WO2015/170974
PCT Pub. Date: Nov. 12, 2015

(65) Prior Publication Data
US 2017/0094936 A1    Apr. 6, 2017

(30) Foreign Application Priority Data
May 9, 2014  (NL) .................................. 2012791

(51) Int. Cl.
*A01J 9/00* (2006.01)
*A01J 5/007* (2006.01)
(Continued)

(52) U.S. Cl.
CPC ................. *A01J 9/00* (2013.01); *A01J 5/007* (2013.01); *A01J 5/044* (2013.01); *A01J 7/022* (2013.01); *A01J 7/027* (2013.01)

(58) Field of Classification Search
CPC ........ A01J 5/02; A01J 5/044; A01J 7/02; A01J 7/027; A01J 9/00; A01J 9/04; A01J 9/06
See application file for complete search history.

(56) References Cited

U.S. PATENT DOCUMENTS 4,570,230 A * 2/1986 Wilson .................... G01F 23/22
                                                                    164/450.3
5,275,124 A * 1/1994 van der Lely .......... A01J 5/007
                                                                    119/14.08
(Continued)

FOREIGN PATENT DOCUMENTS

EP    1 369 034 A2   12/2003
GB    2 303 226 A     2/1997

*Primary Examiner* — Michael H Wang
(74) *Attorney, Agent, or Firm* — Birch, Stewart, Kolasch & Birch, LLP

(57) ABSTRACT

A milk tank system includes a first holder configured for intermediate storage of milk from several milkings of a milking device, and not being a milk glass; a second holder for storage of milk from the first holder; a transport device for transporting milk including a milk line from the first holder to the second holder, via which milk line the second holder may be brought into fluidic connection with the first holder, and a shut-off for shutting off the fluidic connection, in particular from the first holder to the milk line, wherein the transport device has a first operating state which is configured for collecting milk in the first holder, and a second operating state which is configured for transferring the milk from the first holder to the second holder, wherein the milk tank system further includes a control system for switching the transport device from the first to the second operating state when the milk in the first holder reaches a switching milk level which changes over time. Because the pumping of the milk from the intermediate milk storage vessel does not always begin at the same or comparable maximum milk level, but preferably at an ever increasing (Continued)

level, potentially caking milk residue is always rinsed away on a subsequent filling.

20 Claims, 2 Drawing Sheets

(51) Int. Cl.
    *A01J 5/04*     (2006.01)
    *A01J 7/02*     (2006.01)

(56) References Cited

U.S. PATENT DOCUMENTS

| | | | | |
|---|---|---|---|---|
| 5,957,081 | A * | 9/1999 | van der Lely | A01J 5/0175 119/14.09 |
| 6,079,359 | A * | 6/2000 | van den Berg | A01J 5/0175 119/14.01 |
| 6,497,143 | B1 * | 12/2002 | Rinkewich | A01J 9/06 137/395 |
| 6,782,705 | B2 * | 8/2004 | Lidman | A01J 9/04 119/14.01 |
| 7,143,718 | B2 * | 12/2006 | Bosma | A01J 5/0175 119/14.02 |
| 9,155,281 | B2 * | 10/2015 | Bosma | A01J 5/0131 |
| 2011/0168097 | A1 * | 7/2011 | Kristensen | A01J 7/022 119/14.03 |

* cited by examiner

MILK TANK SYSTEM, INTERMEDIATE MILK STORAGE VESSEL FOR THIS, MILKING SYSTEM FOR THIS, AND METHOD FOR CLEANING THIS

BACKGROUND OF THE INVENTION

1. Field of the Invention

The present invention relates to a milk tank system comprising a first holder configured for intermediate storage of milk from several milkings of a milking device, a second holder for storage of milk from the first holder, a transport device for transporting milk which comprises a milk line from the first holder to the second holder, via which milk line the second holder may be brought into fluidic connection with the first holder, and a shut-off means for shutting off the fluidic connection, in particular from the first holder to the milk line, and wherein the transport device has a first operating state which is configured for collecting milk in the first holder, and a second operating state which is configured for transferring the milk from the first holder to the second holder.

2. Description of Background Art

Such milk tank systems are known, and for example used on large dairy farms. The first holder usually serves as a buffer tank for pumping milk to the milk tank, which is a second holder. In all cases, a milk pump of a standard milking device is rarely sufficiently powerful to overcome the high line resistance of long main milk lines in large dairies without overloading the milk. Also, it is expressly pointed out here that the first holder does not comprise a milk glass such as is normal for many milking devices, including robot milking devices. During milking of successive animals, a milk glass will temporarily store milk from the successive milkings, but it is expressly intended that the first holder can store milk from several milkings simultaneously. The volume will then also be significantly greater than that of an average milk glass, and for example be at least 100 liters. Also, the second holder usually means the milk tank in which milk is cooled and stored until the time of collection by a milk tanker. This milk tank often has a capacity of a few thousand liters, and in each case is many times larger than the first holder.

In practice, the first holder is filled with milk from several milkings and is then emptied into the milk tank. One problem which arises is that the first holder (the buffer tank) is often difficult to clean, in particular in relation to caked milk fat.

It is an object of the present invention to create a milk tank system of the type outlined above in which the abovementioned disadvantage is reduced, and which in particular can be kept clean.

The invention achieves this object with a milk tank system comprising a first holder configured for intermediate storage of milk from several milkings of a milking device, a second holder for storage of milk from the first holder, a transport device for transporting milk which comprises a milk line from the first holder to the second holder, via which milk line the second holder may be brought into fluidic connection with the first holder, and a shut-off means for shutting off the fluidic connection, in particular from the first holder to the milk line, and wherein the transport device has a first operating state which is configured for collecting milk in the first holder, and a second operating state which is configured for transferring the milk from the first holder to the second holder, wherein the milk tank system furthermore has a control system for switching the transport device from the first to the second operating state when the milk in the first holder reaches a temporally changeable switching milk level.

The concept behind the present invention is that pumping of the milk out of the first holder does not always begin at the same milk level in the holder. However a layer of foam or milk fat, milk protein or similar always forms on the milk, residue from which may remain behind when the first holder is pumped out. If, as in the prior art, pumping always takes place at the same level, then an ever thicker and further hardening layer of milk fat will be deposited on the wall of the first holder at this level. By starting the pumping out at a level which changes over time, as in accordance with the present invention, this caking and hardening of the milk fat will take place to a far lesser extent. Subsequent cleaning of the first holder can then be carried out more easily and/or better.

It is pointed out here that a switching milk level changeable over time means that the milk level at which switching between the two operating states takes place varies over time. Finally, the milk level itself will also vary over time on supply or discharge of milk, but the relevant factor for the invention is the switching milk level at which the operating state is switched.

The transport of milk by the transport device here means either active or passive transport of milk. The latter includes transport under the influence of gravity, such as in pipes on a gradient and similar. Active milk transport comprises transport by means of a pump or similar. Combinations of the two transport types are also possible.

The first operating state of the transport device here means that milk is captured and collected in the first holder without being able to flow to the second holder, and the second operating state means the state in which the milk can flow from the first holder to the second holder, again actively and/or passively.

It is also pointed out here that the advantage of the present invention is particularly evident on use of this system in a milking system with automatic milking devices and free traffic of animals. The moment of milking the animals is not fixed, and is arbitrarily spread over the day. Thus, much more than with scheduled milking events two or three times a day, it is possible that for some time no milk may be transferred to the first holder. In such a case in particular, caking of the milk fat on the wall of the first holder may take place. This can be a problem in particular if, just before a fixed switching milking level, no fresh milk is added for some time and then so much new milk is added at once that pumping begins. The caked milk fat will then scarcely have time to be dissolved by new milk.

Particular embodiments of the invention are described in the dependent claims and in the description below.

In certain embodiments, the switching milk level is non-decreasing during a time interval, and has a different value for at least two time points during the time interval. In these embodiments, the time interval is selected such that the first holders are emptied at least twice on average. The selection of the time interval may be based on historic averages or similar. Also, in practice, the first holder is usually emptied more often than twice before it is cleaned, but this depends on the size of the dairy and the number of connected milking devices and similar. In said embodiments therefore, emptying of the first holder begins at a higher level each time. Therefore any caked milk residue from most "filling events" will be rinsed away at least partly on subsequent filling of the first holder.

In particular, the switching milk level is strictly increasing at least during a time interval. In these embodiments, on a subsequent emptying of the first holder, the switching milk level is in each case higher than the present level. This ensures optimum rinsing of the milk fat rim, and hence as little caking of milk fat and similar as possible.

In certain embodiments, the switching milk level changes arbitrarily at least during a time interval. In such embodiments, because of statistical variation, the wall of the first holder will be loaded with the milk (fat) deposits as evenly as possible, so that thick deposits occur as little as possible.

In certain embodiments, the switching milk level varies within a predefined bandwidth around the base value, and the base value has an increasing value during the time interval. In these embodiments, the switching milk level will gradually rise, but temporarily may vary within a relatively limited margin. These embodiments also are intended to minimize the local deposit load.

In certain embodiments, the time interval has a predefined and in particular fixed value, and the switching milk level after expiry of the time interval is lower than a switching milk level during the time interval, and in particular equal to a lowest switching milk level during the time interval. Here it is always possible that the switching milk level varies, in particular increases, during the time interval but after expiry of the time interval the switching milk level For these embodiments, a regime is applied so that the switching milk level may be reset. The switching milk level may not continue to rise unlimitedly. In particular, a cleaning interval time is set for the time interval. This is often set to eight hours, so that the first holder is cleaned three times per day. Also however other times are possible, such as for example on the basis of legal stipulations. Another example is a time period of for example two hours, within which period the milk obtained must be cooled to a lower temperature such as 4° C. If for example the first holder is then not yet filled to the switching milk level originally set, the system still switches from the first to the second operating state in order to empty the first holder. In all cases, after emptying, a different switching milk level may be set, wherein if the first holder is cleaned, the switching milk level is reset to the lowest base value, whereas after simply emptying the first holder, the switching milk level may be varied following previously set criteria, as discussed above.

SUMMARY OF THE INVENTION

In particular, the time interval is taken from a first cleaning action of at least the first holder to a successive second cleaning action of at least the first holder. As already indicated above, the time interval may be a time interval between two successive cleaning actions of the first holder. Also, during such a cleaning action, more than merely the first holder may be cleaned, i.e. also the transport device and/or the second holder. This has no influence on the switching milk level to be set.

In certain embodiments, the milk system comprises a milk level determination device which is configured for determining a level of the milk in the first holder and for emitting a level signal on the basis of the milk level determined. In these embodiments, the milk level determination device serves primarily for determining the milk level in order to switch the operating state on the basis thereof. Switching takes place by the control system produced to this end, on the basis of the level signal emitted. Such a milk level determination device may be a direct height meter, such as an array of photoelectric cells which is erected vertically in the first holder, a pressure meter or weight meter which determines the pressure or weight of the milk above it, etc. Also, the milk level value may be determined indirectly on the basis of data concerning the quantity of milk obtained per milking device, which value may then be passed to the control system. For this, the milking devices may comprise suitable devices such as milk flow meters, or meters which determine the weight of the milk glass. Other suitable meters are not however excluded. The milk level determination device may also comprise an array of sensors which indicates merely whether the milk level is higher or lower, such as an array of conductivity sensors. The switching milk level may then be set by selecting a highest of these sensors, wherein the operating state is switched when the milk level reaches the respective sensor. Other alternatives for a milk level determination device known in the prior art are not excluded here.

In particular, the transport device comprises a pump controllable by the control system for transferring milk from the first holder via the milk line to the second holder. As already indicated above, the milk transport may take place both passively and actively. In the present embodiments, the transport takes place actively by means of the controllable pump. The pump may comprise a pump system with two or more pumps. The pump or the pump system may be arranged on or below the first holder, for example just after this, in the milk line. This milk line is also often called the main milk line, to distinguish it from lines which run from the milking devices to the first holder.

In the first operating state, the pump is usually not functioning or is switched such that the milk is not pumped out of the first holder, while in the second operating state the pump can pump the milk to the second holder. This can be achieved by opening or closing valves for example. This will be evident to the person skilled in the art and will not be explained in more detail here.

In certain embodiments, the control system is configured to switch back from the second to the first operating state at a return switching milk level of the milk in the first holder. In these embodiments, a separate return switching milk level is set at which emptying of the first holder is stopped. This may be a zero level, but may also be another level. This may for example be desirable in order to empty the first holder more gradually. Rapid emptying of the first holder can load the milk mechanically, while slower emptying or stopping emptying at a return switching level higher than the zero level, wherein a lower emptying speed may be maintained, may lead to advantages for the milk quality.

Advantageously, the return switching milk level is changeable over time. In these embodiments, it may be advantageous not to pump out all the milk from the first holder, or to stop pumping at the same level so that any milk fat can cake on. It is noted that this will be the case only to a very much lesser extent, because thereafter the level in the first holder may rise again. Nonetheless, with robot milking installations it is possible that no milk is supplied for some time, even if the holder is empty or has just been pumped out.

In certain embodiments, the return switching milk level is either a predefined level difference or a predefined percentage lower than the switching milk level. In these embodiments, the first holder is therefore not necessarily fully emptied, but it is decided to allow a fixed quantity of milk to flow out of the first holder (predefined level difference) or a specific proportion thereof (predefined percentage). This can offer advantages when possibly pumping milk out of the first holder more gradually, with a resulting lower mechanical load.

The invention also relates to an intermediate milk storage vessel for use in a milk tank system according to the present invention, comprising a vessel for containing milk from several milkings, a supply for receiving the milk, a discharge for discharging the milk, and a pump system for pumping the milk from the vessel through the discharge, furthermore comprising a control system for switching the pump system from a first operating state to a second operating state at a temporally changeable switching milk level to be reached by the milk in the vessel.

Such an intermediate milk storage vessel, like the milk tank system according to the invention as described above, offers advantages in relation to cleaning thereof and hence also the achievable milk quality. Both the intermediate milk storage vessel and the milk tank system as a whole may also be fitted later, if for example a small dairy farm with for example one or two milking devices is extended into a much larger enterprise, wherein a first holder is desirable as a buffer tank and the line lengths increase. Furthermore such an intermediate milk storage vessel may also serve as a substitute for existing buffer vessels.

It is noted that all features cited for the milk tank system according to the present invention are equally applicable to the intermediate milk storage vessel according to the invention and offer the same advantages. For the sake of brevity however, these features and advantages are not repeated.

The invention also relates to a milking system comprising a plurality of milking devices, and to a milk tank system connected to the plurality of milking devices, according to the present invention. This aspect of the invention describes a complete milking system with a plurality of milking devices and a milk tank system according to the present invention, in which said advantages can be optimally achieved. As already stated, advantageously the milking devices are robot milking devices.

The invention also relates to a milking method, comprising obtaining the milk using at least one milking device, intermediately storing in a first holder, not being a milk glass, the milk obtained from several milkings, determinating a milk level in the first holder, and connecting a transport device for transporting at least part of the stored milk from the first holder to a second holder when the milk level in the first holder reaches a switching milk level. This method comprises the switching milk level which is changeable over time, whereby the advantages described earlier in this application are achieved. Again, the particular features cited above and their advantages are not repeated, and these also apply to the method without restriction.

In particular, the method comprises performing a cleaning action on the first holder, wherein the switching milk level between two successive cleaning actions of the first holder is a non-decreasing function, preferably a strictly increasing function, of time.

BRIEF DESCRIPTION OF THE DRAWINGS

The invention will now be explained in more detail with reference to the drawing which shows a non-restrictive exemplary embodiment, and wherein.

DETAILED DESCRIPTION OF THE INVENTION

Figure 1:
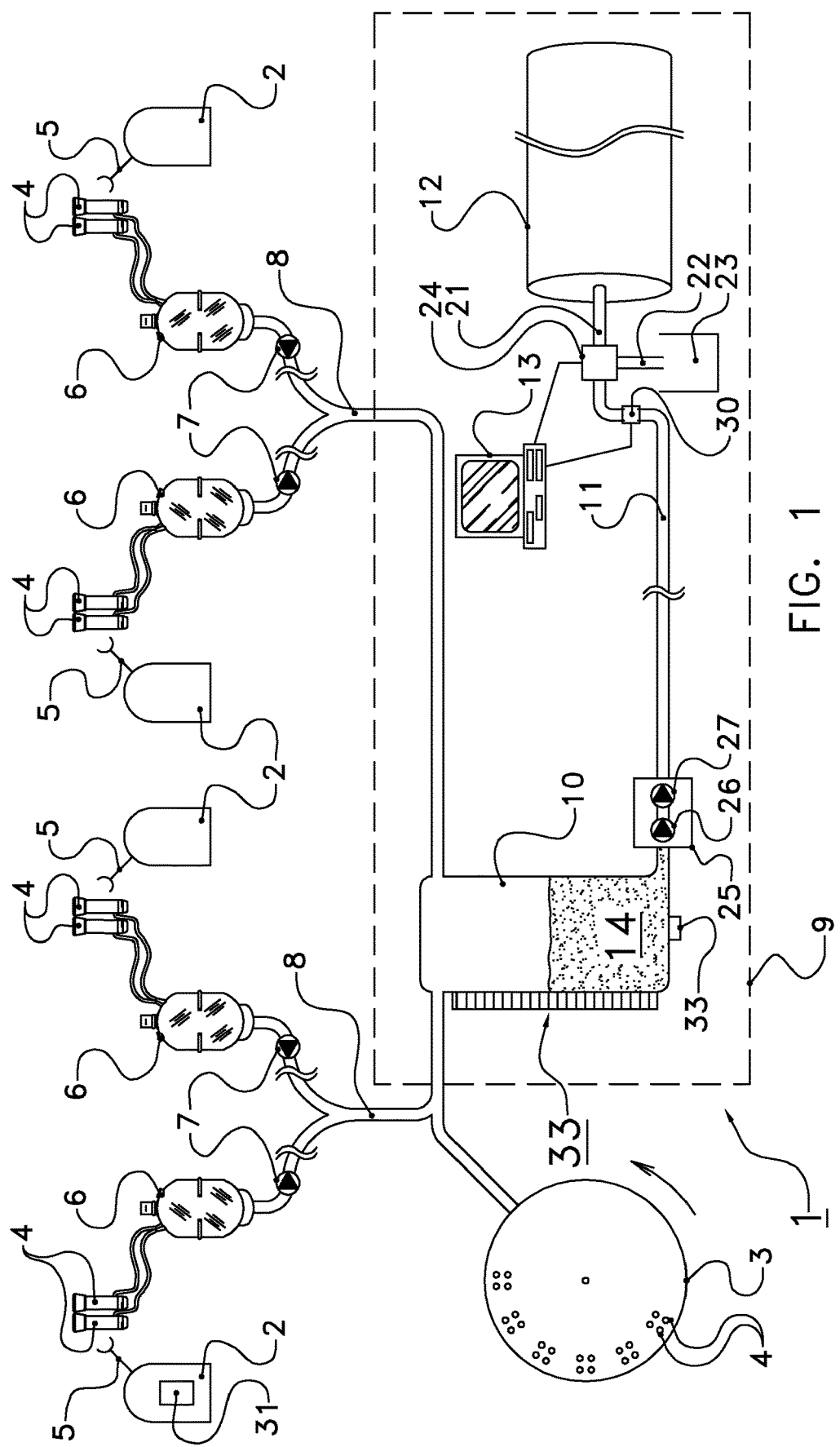
FIG. 1 depicts in a highly diagrammatic view a milking system 1 according to the invention.

FIG. 1 depicts a milking system 1 according to the invention in a highly diagrammatic view. The milking system 1 here comprises four milking robot devices 2 and a carousel 3. Each milking robot device 2 has milking cups 4 and a gripper arm 5 for placing the milking cups on the teats of a dairy animal. A milk glass 6 is also provided for capturing the milk from a milking, and a milking pump 7 for pumping the milk through the milk line 8 to a milk storage system 9, comprising an intermediate milk storage vessel 10 which is connected via a main milk line 11 to a milk tank 12 and which receives the milk 14.

A control system is designated 13, a first discharge 21 and a second discharge 22 to an outlet capture unit 23 and a selection device 24. 25 indicates a pump system with a first pump 26 and a second pump 27. 30 indicates a sensor for the fluid quality, and 33 and 33' are milk level sensors.

The milking system 1 shown here comprises a carousel 3 with a plurality of milking stands with milking cups 4, and also four milking robot devices 2. It is clear that the milking system may also comprise merely one carousel or a plurality of carousels, and also merely any number of milking robot devices such as two, eight, sixteen etc. Also, not all details relevant to the invention are shown, such as milking stands at the milking robot devices etc.

Each milking robot device 2 is configured for milking a dairy animal at a milking stand (not shown). For this, using the gripper arm 5 or another suitable device, the milking robot device 2 places the milking cups 4 on the teats of the dairy animal. Here only two milking cups 4 are shown, which is sufficient for a goat or similar. For cows, four milking cups are required. The milk obtained with the milking cups 4 is captured per milking in the milk glass 6. The milking robot device 2 is furthermore configured to determine whether the milk from the milking, as consumption milk, should be transferred from the milk glass 6 to the milk tank 12. For this, the milking robot device 2 has apparatus not shown here, such as a milk quality device or a management system which, for example on the basis of an established animal identity, can determine whether the milk is suitable or unsuitable for human consumption. If the milk is found to be unsuitable, a discharge (not shown here) of the milk is created from the milk glass 6 e.g. to a drain or to a residual milk capture unit. If the milk is found suitable for human consumption, it is pumped by the milk pump 7 from the milk glass 6 into the milk line system 8. The milk is then captured in the milk storage system 9, which here comprises an intermediate milk storage vessel 10.

The intermediate milk storage vessel 10 receives milk from several milkings, and for example—as shown here—milk from a plurality of milk glasses and/or from a carousel 3. The volume of the intermediate milk storage vessel 10 is then selected accordingly, and for example comprises a few hundred liters.

When the intermediate milk storage vessel 10 is sufficiently full, the milk is pumped out by the pump system 25 through the main milk line 11 to the milk tank 12. This is controlled by the control system 13, which is here depicted only highly diagrammatically. The same applies to the connections depicted between the control system 13 and the various components of the milking system 1 controlled by the control system 13, which connections are here only shown in part and highly diagrammatically. It is self-evident that an active connection is present between the control system 13 and the controlled components of the milking system 1, which connection may be hard-wired or wireless.

Milk 14 is present in the milk storage vessel 10 to a specific level. This level may be determined with the milk level meter 33, 33'. The milk level meter 33, 33' may for example be a weighing cell which is arranged below the intermediate milk storage vessel 10, or alternatively or additionally an array of conductivity pins 33' arranged along the wall of the vessel 10, a pressure sensor etc. Depending on the level of the milk 14 in the vessel 10, the milk level meter 33, 33' emits a specific signal which can be processed by the control system 13. When a specific milk level is reached in the vessel 10, the control system 13 may switch on the pump system 25 to lower the level of the milk 14 and pump the milk 14 to the milk tank 12 via the main milk line 11.

Each milking device is cleaned after one or more milkings. Preferably, all milking devices, such as the milk robot devices 2 and the carousel 3, are cleaned in one cleaning action, either in parallel or sequentially or in combination. These details however lie outside the scope of the invention and are not discussed here.

It is also pointed out that the pump system 25 here comprises a first pump 26 and a second pump 27. The pump system 25 may thus for example pump at several pump speeds, such as at a first pump speed set by the first pump 26 for pumping the milk, and at a second higher pump speed for pumping cleaning fluid using the second pump 27 or both pumps 26 and 27; this can also be achieved with a single controlled pump.

Figure 2:
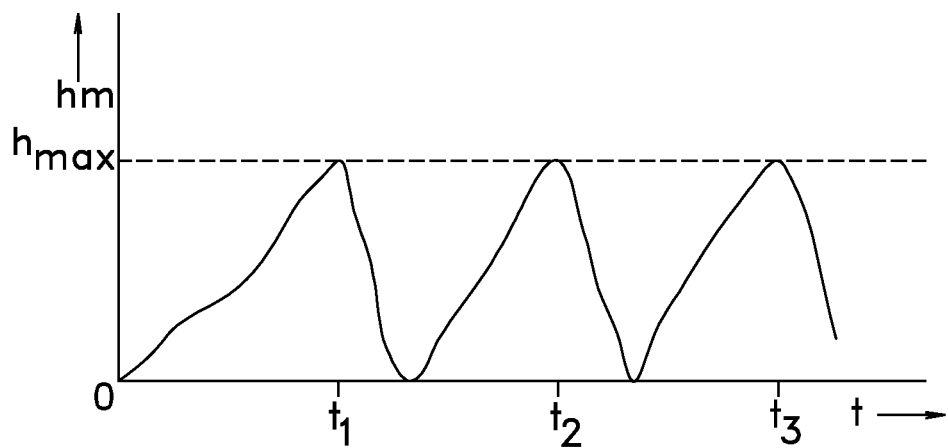
FIG. 2 depicts schematically a diagram of the milk level development in a milking system according to the prior art.

FIG. 2 depicts schematically a diagram of the development of the level of the milk 14 in a storage vessel 10 according to a milking system of the prior art. It is evident here that at time $t_0$, the milk level $h_m$ begins to rise from 0 until it reaches a height $h_{max}$ at time $t_1$. At that moment, a pump system is switched on and the milk level begins to fall towards 0. The pump system is then switched off and the milk level begins to rise again until at time $t_2$ it has again reached the same level $h_{max}$. The same cycle is repeated again from pumping out to 0, allowing the milk level to rise to $h_{max}$ and then pumping out again (such as now at time $t_3$). With such a system, pumping out always begins at the same maximum milk level, so that in a storage vessel, caking of for example milk fat or similar can occur at level $h_{max}$. On the subsequent cleaning, this caking can be removed; however this is not always easy.

Figure 3:
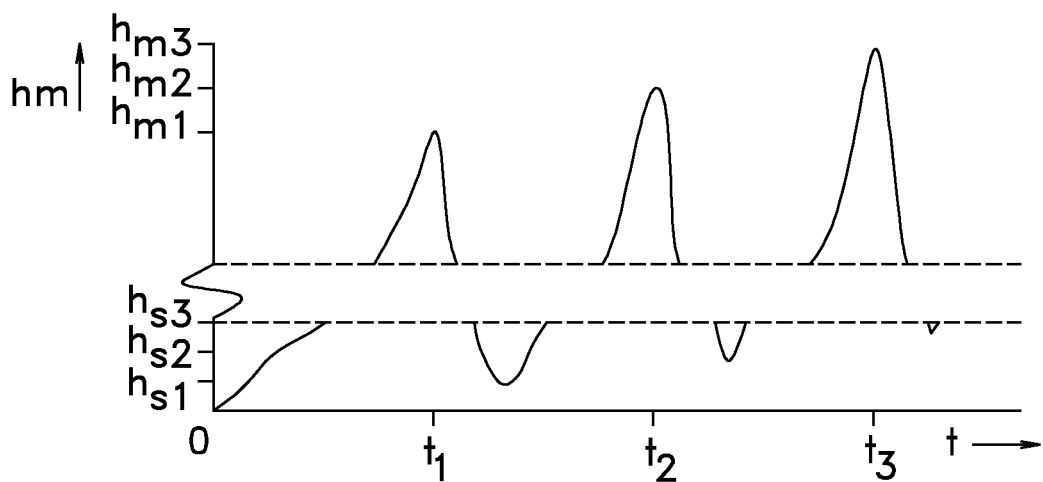
FIG. 3 depicts a filling and pumping out regime according to the present invention.

FIG. 3 in contrast shows a filling and pumping out regime according to the present invention. This again begins at time 0 with a milk level 0, which then rises until a height $h_{m1}$ is reached at time $t_1$, after which milk is pumped out to a stop level $h_{s1}$. Then the milk level rises again but now until at time $t_2$, a height $h_{m2}$ is reached after which pumping out takes place to a higher stop level $h_{s2}$. Then, after the milk level has reached level $h_{m3}$, pumping out begins again at time $t_3$, now until a stop level $h_{s3}$, and so on. In this regime, there is no fixed height at which pumping out begins, so there is no fixed height at which milking deposits can occur. Each highest level can then be rinsed by the next filling, because the inflowing milk can partially dissolve and dissipate the deposits. Only the highest pumping out level cannot be rinsed by a subsequent higher filling. This is not however serious because it is precisely this highest filling which has only a very short time to dry and cake, because the subsequent cleaning preferably takes place directly after pumping out from the highest fill level.

Figure 4:
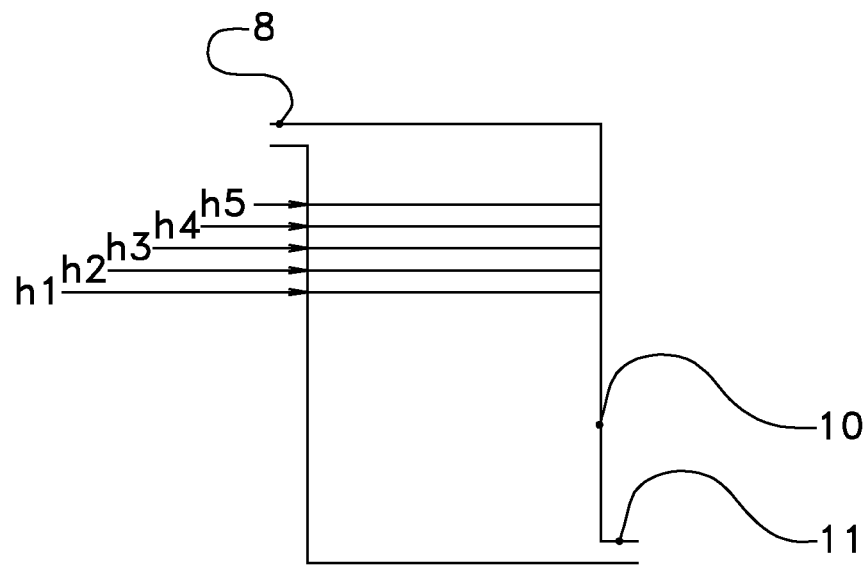
FIG. 4 depicts a diagrammatic example of milk levels to be reached in the intermediate milk storage vessel 10.

FIG. 4 depicts a diagrammatic example of milk levels to be reached in the intermediate milk storage vessel 10. For example, pumping out begins for the first time when milk level $h_1$ is reached. On the next filling of the storage vessel 10, the milk level can rise to level $h_2$, then $h_3$, then $h_4$ and then $h_5$. After pumping from this last level, for example a cleaning of the intermediate storage vessel 10 may take place. It is noted that the levels $h_1$ to $h_5$ shown may in practice vary in number and in height relative to the intermediate milk storage vessel 10. For example there is no point in pumping out from a very low first level $h_1$, because the number of pump cycles would become unnecessarily high. For example, level $h_1$ may be at least three-quarters of the maximum milk level to be reached in the vessel 10. Nonetheless, any other ratio between the lowest pumping level and the highest pumping level is possible. This can be determined in practice, for example from the time between pumping actions.

It is again stated here that a great advantage of the present invention is that pumping out of the milk from the intermediate milk storage vessel 10 does not begin at the same or comparable maximum milk level, but preferably at an ever increasing level, so that any caked milk residue is in each case rinsed away on a following filling. Cleaning is then performed only at the (very) highest level, so that no caking problems occur.

The embodiments shown are only intended as non-limitative examples. The scope of protection is determined from the enclosed claims.

The invention claimed is:

1. A milk tank system comprising:
   a first holder configured for intermediate storage of milk from several milkings of a milking device, wherein said first holder is not a milk glass;
   a second holder for storage of milk from the first holder;
   a transport device for transporting milk, said transport device comprising:
      a milk line from the first holder to the second holder, via which milk line the second holder may be brought into fluidic connection with the first holder; and
      a shut-off for shutting off the fluidic connection between the first holder and the second holder,
      wherein the transport device has a first operating state which is configured for collecting milk in the first holder without milk being able to flow to the second holder, and a second operating state which is configured for transferring the milk from the first holder to the second holder; and
   a control system for switching the transport device from the first operating state to the second operating state when the milk in the first holder reaches a switching milk level which changes over time during a time interval.

2. The milk tank system as claimed in claim 1, wherein the switching milk level is non-decreasing during the time interval, and the switching milk level has a different value for at least two time points during the time interval.

3. The milk tank system as claimed in claim 2, wherein the switching milk level is strictly increasing at least during the time interval.

4. The milk tank system as claimed in claim 2, wherein the switching milk level changes arbitrarily at least during the time interval.

5. The milk tank system as claimed in claim 4, wherein the switching milk level varies within a predefined bandwidth around a base value, and the base value has an increasing value during the time interval.

6. The milk tank system as claimed in claim 2, wherein the time interval has a predefined value, and wherein the switching milk level after expiry of the time interval is lower than a switching milk level during the time interval.

7. The milk tank system as claimed in claim 2, wherein the time interval is taken from a first cleaning action of at least the first holder to a successive second cleaning action of at least the first holder.

8. The milk tank system as claimed in claim 2, wherein the time interval has a predefined and fixed value, and wherein the switching milk level after expiry of the time interval is lower than a switching milk level during the time interval, and is equal to a lowest switching milk level during the time interval.

9. The milk tank system as claimed in claim 1, further comprising a milk level determination device configured for determining a level of the milk in the first holder and for emitting a level signal on the basis of the milk level determined.

10. The milk tank system as claimed in claim 1, wherein the transport device comprises a pump controllable by the first control system for transferring milk from the first holder via the milk line to the second holder.

11. The milk tank system as claimed in claim 1, wherein the first control system is configured to switch back from the second operating state to the first operating state at a return switching milk level of the milk in the first holder.

12. The milk tank system as claimed in claim 11, wherein the return switching milk level is changeable over time.

13. The milk tank system as claimed in claim 11, wherein the return switching milk level is either a predefined level difference or a predefined percentage lower than the switching milk level.

14. An intermediate milk storage vessel for use in the milk tank system as claimed in claim 1, comprising:
a vessel for containing milk from several milkings;
a supply for receiving the milk;
a discharge for discharging the milk;
a pump system for pumping milk from the vessel through the discharge; and
the control system for switching the pump system from a first operating state to a second operating state at a temporally changeable switching milk level to be reached by the milk in the vessel.

15. A milking system comprising:
a plurality of milking devices; and
a milk tank system connected to the plurality of milking devices, wherein the milk tank system is as claimed in claim 1.

16. The milking system as claimed in claim 15, wherein the milking devices are in robot milking devices.

17. The milk tank system as claimed in claim 1, wherein the shut-off is configured to shut off the fluidic connection from the first holder to the milk line.

18. A milking method of using the milk tank system according to claim 1, comprising the steps of:
obtaining milk using at least one milking device;
intermediately storing the milk obtained from several milkings in the first holder, wherein the first holder is not a milk glass;
determinating a milk level in the first holder; and
connecting the transport device for transporting at least part of the stored milk from the first holder to the second holder when the milk level in the first holder reaches a switching milk level, which switching milk level is changeable over time.

19. The method as claimed in claim 18, further comprising the step of performing a cleaning action of the first holder, wherein between two successive cleaning actions of the first holder, the switching milk level is a non-decreasing function of time.

20. The method as claimed in claim 18, further comprising the step of performing a cleaning action of the first holder, wherein between two successive cleaning actions of the first holder, the switching milk level is a strictly increasing function of time.

* * * * *